Oct. 14, 1952  F. STEYER ET AL  2,614,149
VARIABLE CAPACITOR
Filed Aug. 31, 1950
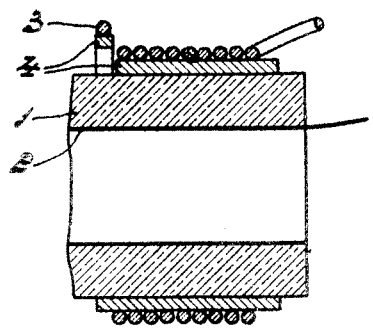
FRIEDHELM STEYER &
WILLY WERNER
INVENTORS
BY
Fred M. Vogel.
AGENT Patented Oct. 14, 1952

2,614,149

UNITED STATES PATENT OFFICE 2,614,149

VARIABLE CAPACITOR

Friedhelm Steyer and Willy Werner, Hamburg, Germany, assignors to Hartford National Bank and Trust Company, Hartford, Conn., as trustee Application August 31, 1950, Serial No. 182,442
In Germany September 10, 1949

2 Claims. (Cl. 175—41.5)

This invention relates to variable capacitors having a solid dielectric, more particularly high frequency trimmer capacitors, the value of which is altered by unwinding a wire-shaped electrode.

Such capacitors are termed "wire trimmers" and comprise a tubular dielectric consisting, for example, of a low-loss ceramic mass. The inner wall of the tube is provided, by penetration, with a metal coating to constitute a fixed electrode, whereas the wire-shaped electrode adapted to be unwound bears directly on the surface of the ceramic and is secured for example by soldering.

These known constructions have a loss factor considerably exceeding the loss factor of the ceramic material itself, notably with materials having a high permittivity. Moreover, the value of the capacitor is considerably lower than might be expected with the use of these materials. These disadvantages of the known construction are due to the fact that the capacitor actually constitutes a dielectric consisting of layers, since an air-gap is present between the solid dielectric and the electrode wound on it. With dielectrics consisting of layers the value of the capacitor is determined, as is well known, by the values of the permittivity of the separate layers, depending upon their thicknesses.

A thin layer of air may consequently involve a considerable capacity modification, notably with low-loss ceramic dielectrics of high permittivity. Furthermore, a considerable field strength will occur in the thin layer of air with a small radius of curvature of the wire, with the result that, on approaching the limit of breakdown strength of the air, particularly due to the spraying action at points the losses greatly increase, notably at a comparatively high degree of humidity of the air.

The said disadvantages are avoided according to the invention. The electrode adapted to be unwound consists of a homogeneous, electrically conductive metal layer which is provided on the dielectric and to which a single-layer wire coil is secured in such manner that, upon unwinding the wire, the subjacent metal layer is lifted from the dielectric. In known constructions the wire adapted to be unwound bears directly on the solid dielectric. According to the invention, however, the solid dielectric carries a homogeneous, electrically conductive metal layer which may be obtained by covering the dielectric with a silver-containing layer of lacquer or the like or by applying or burning in a silver solution. Subsequently, the wire coil is secured, for example by soldering it to the substratum.

The losses of capacitors according to the invention hardly exceed those of a corresponding fixed ceramic capacitor. With capacitors according to the invention, which may be of any desired size, the capacity value is varied by unwinding the wire rigidly secured to the intermediate layer, the latter being stripped from the dielectric. To this end the intermediate layer should on the one hand be of a metallic nature but on the other hand be firmly connected to the dielectric only to such a degree as to permit of stripwise removal together with the wire connected metallically to it.

In order that the invention will be more clearly understood and readily carried into effect it will now be described in detail with reference to the accompanying drawing in which the sole figure shows a capacitor constructed in accordance with the invention.

A tubular dielectric carrier member consisting, for example, of ceramic material, glass and the like is designated 1. A fixed silver electrode 2 may, for example, be provided on the inside of the tube 1 by burning in. The wire electrode 3 is wound on the dielectric member with the interposition, according to the invention, of a variable electrode 4 which constitutes an intermediate metallic layer. The extreme left-hand turn is shown removed as shown in the drawing, the intermediate layer being removed stripwise from the carrier member together with the wire.

A method of manufacturing capacitors according to the invention consists in first making a sintered ceramic body in a known manner. This body is furnished, by penetration, with a metallic non-variable electrode. By a further treatment, at the side of the dielectric opposite the fixed electrode, a removable intermediate layer is, according to the invention, provided on the said body and burnt in at such a temperature as to acquire a metallic nature and permit to be removed mechanically. The force required for removing the layer may be 50 to 250 gms. Subsequently, the wire coil is provided on the intermediate layer and soldered thereto. Finally, the surface is covered with a protecting layer, for example a lacquer or paraffin, in order to avoid corrosion.

What we claim is:

1. A variable capacitor comprising a tubular dielectric body, a metal layer electrode fixedly secured to the internal wall of said tubular dielectric body, a metal layer electrode removably secured to the external wall of said body constituting a variable electrode of said capacitor, and a wire coil secured to said variable electrode and removable therewith turn-by-turn to vary the capacity of said capacitor.

2. A variable capacitor comprising a tubular body of low loss ceramic material constituting a dielectric, a metal layer fixedly secured to the internal wall of said tubular body and constituting a fixed electrode of said capacitor, a metal layer electrode removably secured to the external wall of said body constituting a variable electrode of said capacitor and a wire coil secured to said variable electrode and removable therewith turn-by-turn to vary the capacity of said capacitor.

FRIEDHELM STEYER.
WILLY WERNER.

REFERENCES CITED

The following references are of record in the file of this patent:

UNITED STATES PATENTS

| Number | Name | Date |
|---|---|---|
| 1,715,319 | Houck | May 28, 1929 |
| 2,532,836 | Cupido | Dec. 5, 1950 |

FOREIGN PATENTS

| Number | Country | Date |
|---|---|---|
| 472,593 | Great Britain | Sept. 27, 1937 |
| 560,372 | Great Britain | Mar. 31, 1944 |